C. SHARPS.
Revolver.
No. 2.480.
Reissued Feb. 12, 1867.
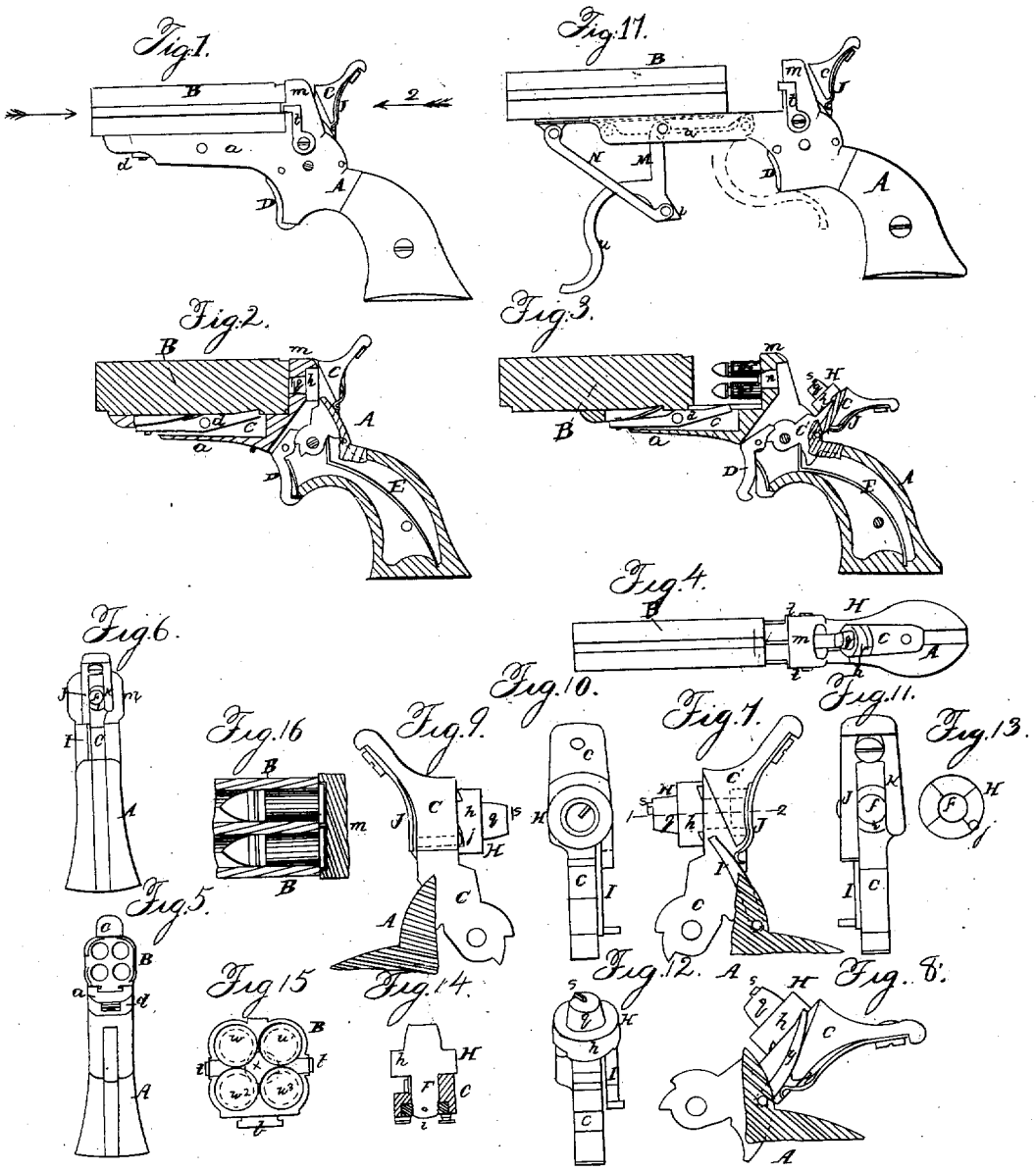
Witnesses
Henry Houson
Henry Odiorne
Inventor.
Christian Sharps
N. PETERS, PHOTO-LITHOGRAPHER, WASHINGTON, D. C.

UNITED STATES PATENT OFFICE.

CHRISTIAN SHARPS, OF PHILADELPHIA, PENNSYLVANIA.

IMPROVEMENT IN MANY-BARRELED FIRE-ARMS.

Specification forming part of Letters Patent No. 22,753, dated January 25, 1859; Reissue No. 1,199, dated June 18, 1861; Reissue No. 2,480, dated February 12, 1867.

*To all whom it may concern:*

Be it known that I, CHRISTIAN SHARPS, of Philadelphia, Pennsylvania, did, on the 25th day of January, A. D. 1859, obtain Letters Patent of the United States for Improvements in Breech-Loading Repeating Fire-Arms; that the said Letters Patent were reissued on the 18th day of June, A. D. 1861; and that I declare the following to be a full, clear, and, exact description of that part of the said invention which consists in the combination of a discharger with a hammer, and the devices described hereinafter, or their equivalents, for changing the position of the discharger on the movement of the hammer.

In order to enable others skilled in the art to make and use my invention, I will now proceed to describe its construction and operation.

On reference to the accompanying drawings, which form a part of this specification, Figure 1 is an exterior side view of a breech-loading fire-arm with my improvements; Fig. 2, a longitudinal section of the same with the hammer down; Fig. 3, a longitudinal section of the same with the hammer cocked and the barrel moved out; Fig. 4, a plan view; Fig. 5, an end view looking in the direction of the arrow 1, Fig. 1; Fig. 6, an end view looking in the direction of the arrow 2, Fig. 1; Fig. 7, a detached view (drawn to an enlarged scale) of the hammer when down; Fig. 8, the same view of the hammer when cocked; Fig. 9, a side view of the hammer—the reverse of that illustrated in Fig. 7; Fig. 10, a front view of the hammer; Fig. 11, a rear view of the hammer; Fig. 12, a front view of Fig. 8; Fig. 13, a rear view of the discharger, showing the notches and retaining-pin; Fig. 14, a sectional view of the hammer with its discharger on line 1 2, Fig. 7; Fig. 15, a view showing the end of the barrel with its four cartridges, all having been discharged excepting one; Fig. 16, a sectional view of the barrel through two of the bores and part of the breech; and Fig. 17, an exterior view of the pistol, showing a lever arrangement for operating, locking, and releasing the barrel.

Similar letters refer to similar parts throughout the several views.

A is the stock of the pistol, and B the barrel, which has in this instance four bores, open at the rear and arranged, in the manner shown in Figs. 5 and 15, at equal distances apart from each other and from a central point, *x*, Fig. 15.

The under side of the barrel is made perfectly straight, so as to fit accurately on the projecting portion *a* of the stock, which has grooves adapted to receive the lips of the projection *b*, Fig. 15, on the under side of the barrel, this projection being of such a form as to retain the barrel in close contact with the projection *a* of the stock and allow the former to be moved to and fro longitudinally.

In the projecting portion *a* of the barrel, and between the grooves for receiving the lips of the projection *b*, a chamber or recess, *c*, is formed, and within the same is hung a catch-lever, *d*, having two arms, the end of one arm fitting into a notch on the under side of the barrel, where it is retained by a spring, *e*, attached to the end of the opposite arm of the lever and bearing against the under side of the barrel. The arm of the lever to which it is connected projects so far through an opening in the end of the projection *a* of the stock as to be easily elevated by applying the finger to it, thereby depressing the opposite arm and releasing the barrel, which can be then moved outward until its notch comes in contact with the front of the spring, as seen in Fig. 3.

C is the hammer, D the trigger, and E the main-spring of the fire-arm, all being arranged within a recess formed in the stock, the two former being hung to pins passing transversely through the stock, and the spring bearing with its point in an angular recess formed in the hammer.

H is the discharger, the pin *f* of which,) see Fig. 14,) fits snugly but so as to turn freely in an orifice in the hammer C, to which it is confined on one side by a collar, *h*, which forms part of the discharger, and on the opposite side by a nut, *i*, which fits into a recess in the rear of the hammer, and which screws onto or is otherwise secured to the end of the pin *f*. On the inside of the collar *h* of the discharger, and where it bears against the hammer, are cut four radial inclined notches (see Fig. 13) at equal distances apart, so as to form a ratchet.

A pin, *j*, Figs. 9 and 13, passes freely through a hole in the hammer, and is caused by means of a spring, *k*, to bear with its point against the ratchet, and thus serves to retain the discharger H in a given position prior to its being moved therefrom on the cocking of the hammer, as explained hereinafter.

To a pin secured to the stock is hung a finger, I, the point of which is adapted to the teeth of the ratchet on the collar *h*, in gear with one or other of which it is maintained by a spring, J, secured to the back of the hammer. This finger is so arranged in respect to the teeth that it rests, when the hammer is down, on a projection on the stock, the point being then clear of the said teeth. When the hammer, however, is in the act of being drawn back the ratchet on the collar *h* is brought in contact with the finger, the point of the latter fitting into one of the teeth and turning the discharger, so that when the hammer has reached the position of full-cock the discharger will have been turned one quarter of its circumference round, and in this position it is retained by the pin *j* during the descent of the hammer, when the finger I, by the action of the spring J, recovers its former stationary position on the stock until the hammer is again cocked, when the discharger will have been moved another quarter of its circumference round, as before.

In the breech *m*, which projects from and forms a part of the stock, is a circular opening, *n*, for the free admission of the end *q* of the discharger H when the hammer is down, the center of the opening *n* coinciding with that of the discharger, and the centers of both coinciding with the central point, *x*, Figs. 5 and 15, of the barrel. On the face of the end of the discharger, and at or near the edge of the same, is a projection, *s*, which is the immediate cause of the ignition of the detonate contained in the enlarged ends of the cartridges.

It should be understood that the cartridges to be used in connection with my improved fire-arm consist of a metal case containing powder, a portion of the bullet being inserted into and secured to one end of the case, and the opposite end being enlarged so as to form a flange or head for preventing the cartridge from entering too far into the bore of the barrel and for containing the detonating material. In the breech *m* four circular recesses are formed, coinciding with the four bores of the barrel, and into these recesses fit the heads of the cartridges when the barrel is brought home to the breech. The rear of each cartridge is thus covered by the breech, excepting a small portion of the edge, which is necessarily exposed at the central opening, *n*, as best observed on reference to Fig. 15.

On each side of the stock is secured a spring-catch, *t*, for retracting the spent cartridges on moving the barrel outward. As this retracting device does not appertain to that part of my invention described in the present specification, and as it is fully explained in another specification which I have prepared in making application for two reissued patents of my aforesaid reissued patent of June 18th, 1861, it will be unnecessary to explain the construction and operation of the device here.

Operation: The barrel having been moved forward to the position shown in Fig. 3, the hammer having been cocked, and the cartridges having been inserted into the rear of the several bores, the barrel is pushed back to the breech *m*, (into the recess of which the heads of the cartridges fit,) and, the catch-lever *d* having assumed its position in the notch on the under side of the barrel, the pistol is ready for firing. When the trigger is drawn the projection *s* on the face of the discharger will strike on the edge of the flange of the cartridge and cause the same to be discharged. When the hammer is again cocked prior to a second fire the discharger must have turned, as hereinbefore described, one-quarter round, and its projection *s*, on account of its eccentricity with the center of rotation of the discharger, must have been turned away from the cartridge upon which it had last acted and have assumed a position ready to act upon a second cartridge, and, the position of the projection *s* changing every time the hammer is thrown back, one cartridge after another will be acted upon in succession until the whole are discharged. The end of the catch-lever *d* which projects through the end of the stock is then elevated, and the barrel released and pushed forward preparatory to being reloaded.

I am aware that Geo. Leonard, in his patent of September 18, 1849, described a discharger to which such movements could be imparted as to strike, one after another, ordinary caps on a barrel having a number of bores closed at the rear; but I am not aware that the combination of a stationary barrel, having a number of bores open at the rear for the reception of metallic cartridges, with a discharger to which such a motion can be imparted that it will strike one of the said cartridges after another was ever known or used prior to the date of my said patent.

I wish it to be understood that I do not desire to confine myself to the use of a barrel with four bores, as a barrel with more or less than that number of bores may be used; nor do I wish to confine myself to the precise construction, arrangement, and operation of the within described discharger, as it will be evident to those familiar with the construction of fire-arms that it may be modified without departing from the main features of my invention; but

I claim and desire to secure by Letters Patent—

The combination of a discharger with the hammer and the devices herein described, or the equivalents to the same, for changing the position of the discharger on the movement of the hammer.

In testimony whereof I have signed my name to this specification before two subscribing witnesses.

Witnesses: CHRISTIAN SHARPS.
HENRY HOWSON,
JOHN WHITE.